UNITED STATES PATENT OFFICE.

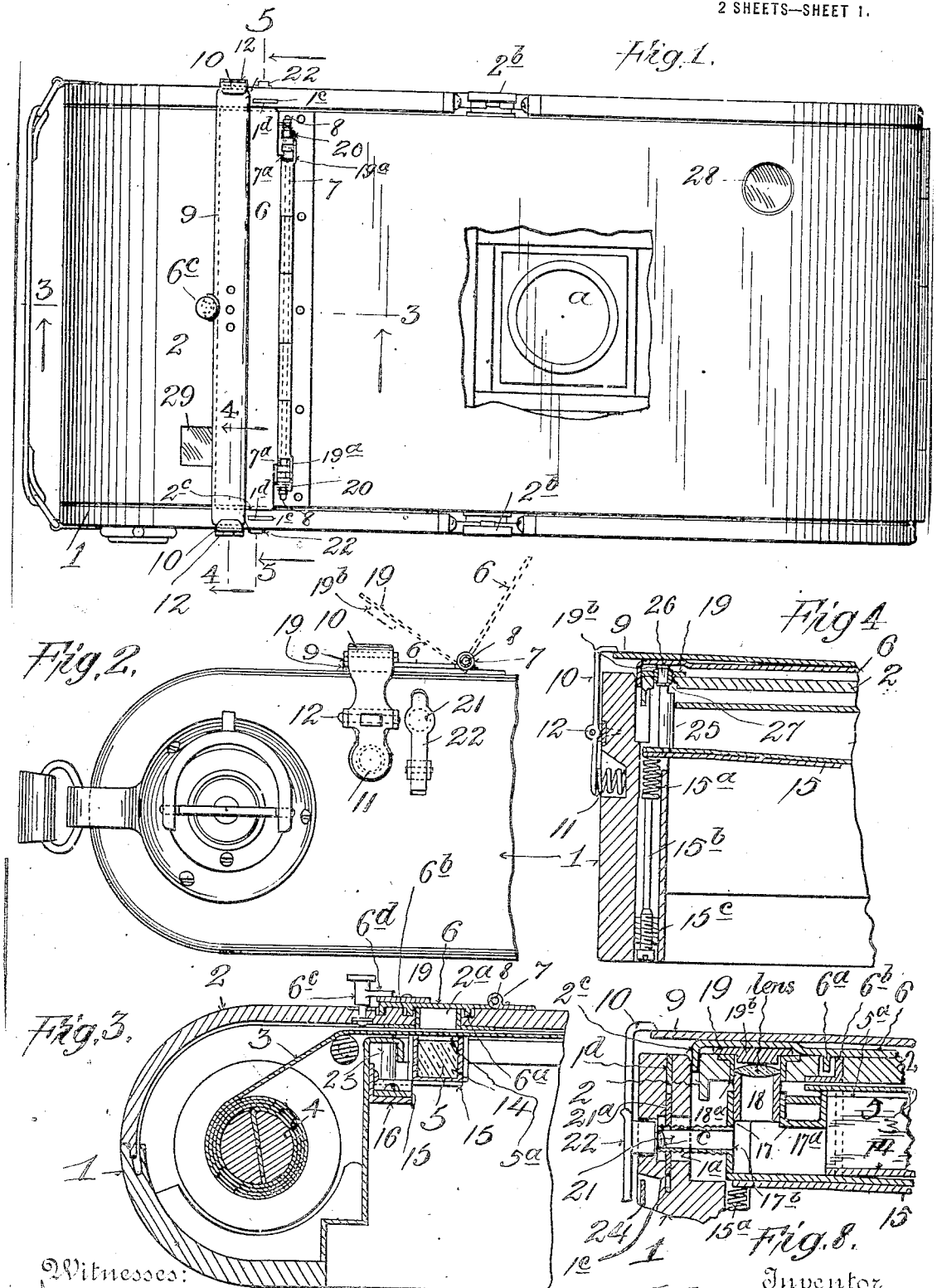

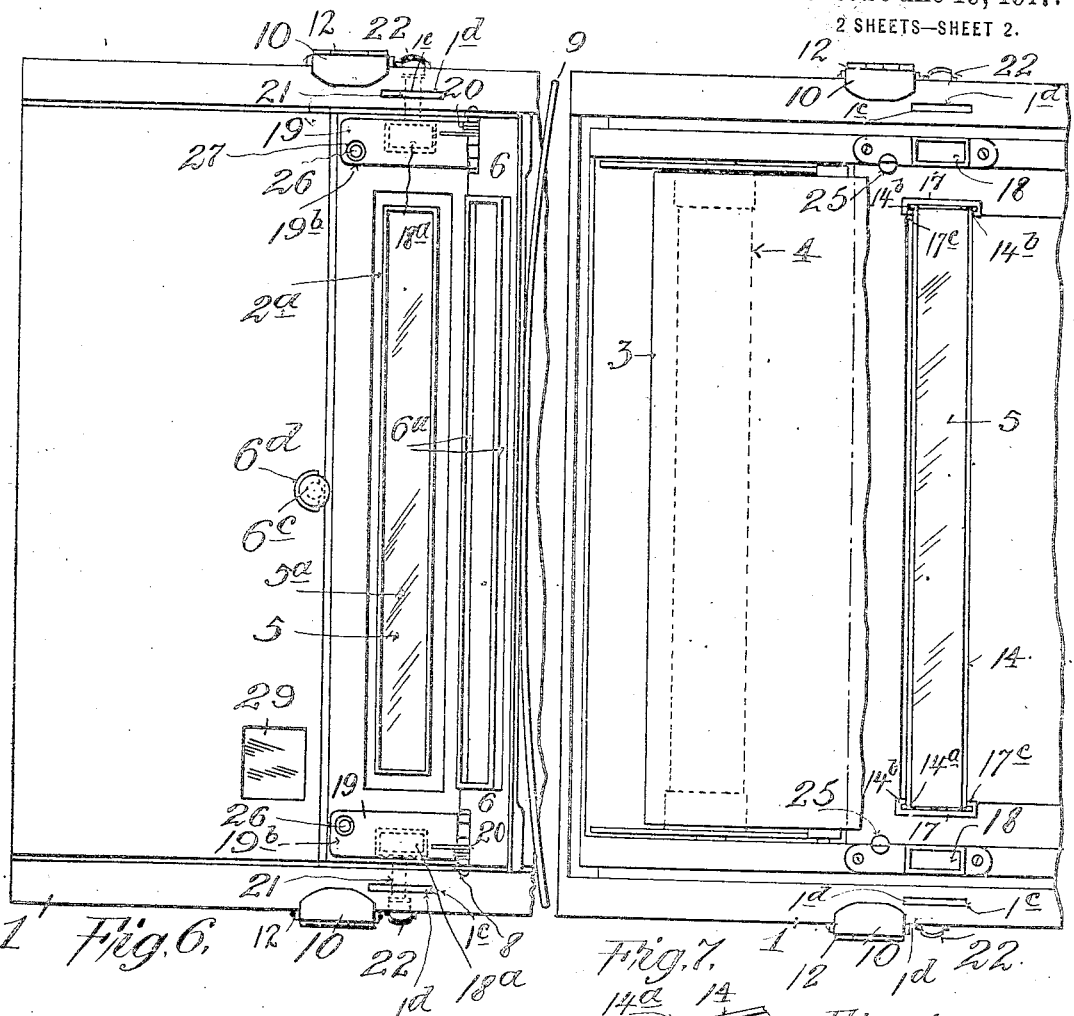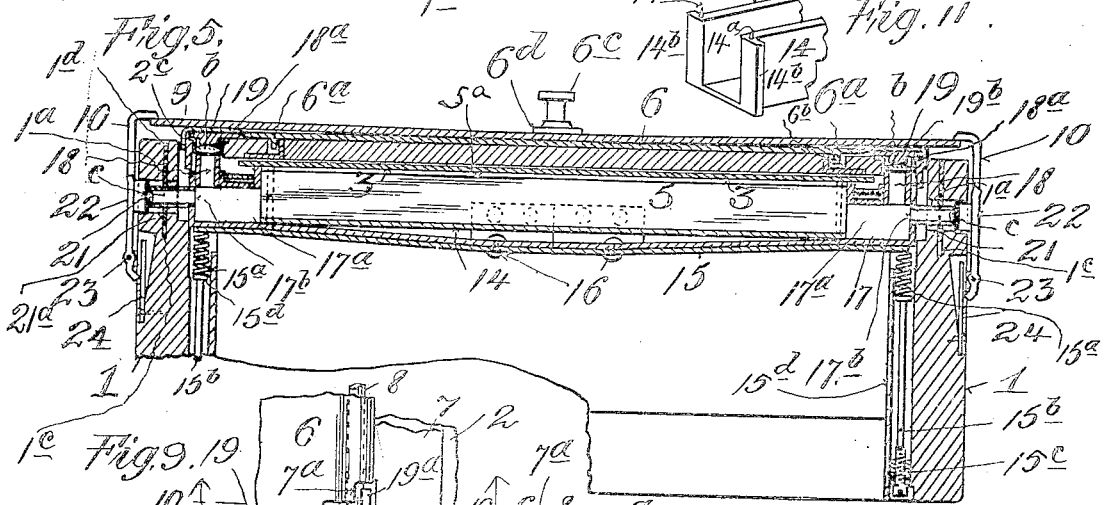

HENRY J. GAISMAN, OF NEW YORK, N. Y., ASSIGNOR TO EASTMAN KODAK COMPANY, OF ROCHESTER, NEW YORK, A CORPORATION OF NEW YORK.

PHOTOGRAPHIC APPARATUS.

1,230,399. Specification of Letters Patent. Patented June 19, 1917.

Application filed March 29, 1912. Serial No. 687,018.

*To all whom it may concern:*

Be it known that I, HENRY J. GAISMAN, a citizen of the United States, and resident of New York city, borough of Manhattan, in the county of New York and State of New York, have invented certain new and useful Improvements in Photographic Apparatus, of which the following is a specification.

My invention relates to improvements in photographic apparatus or cameras, and has for its object to permit light to strike a desired portion of a contained film or sensitized element at will, to produce on the film or element a space not necessarily involved in the picture or object photographed through the ordinary photographic lens, and to this end I provide means to shut off a portion of the film or sensitized element from exposure to the photographic lens and to admit light to said portion of the film or sensitized element without requiring the use of the photographic lens. In the embodiment of my invention herein set forth I also show means whereby writing may be produced upon a portion of a film, and such portion of the film may be exposed to light for fixing the writing upon the film without the use of the photographic lens.

In my application for patent on photographic apparatus, filed March 23, 1911, Serial No. 616,428, I have set forth a photographic apparatus comprising means for permitting writing upon the back of a contained flexible film while protected from light by a flexible cover to cause desired designations to be light printed or photographed upon the sensitized surface of such film when exposure thereof is made in the ordinary manner through a photographic lens, and in said application I have illustrated and described what I term a "transfer medium" comprising a plate or support preferably roughened upon which the sensitized surface of the film rests in a position where the writing is to be produced.

In my present invention I provide means to permit writing upon the film in substantially the same manner as in my prior application, and to control the admission of light only to that portion of the film upon which the writing has been produced, without reference to exposing the film to the photographic lens in the ordinary manner, whereby designations written upon the film may be caused to be fixed on the film without moving the film from the position in which it is located at the time of writing thereon. The means by which such exposure of a portion of the film is made to fix the writing upon the film may be used without having written upon the film, in order to produce upon the film a mortise or blank space which will not embrace the picture when the main portion of the film is exposed to the photographic lens in the ordinary manner. The designation or mortise aforesaid may be fixed with a strong light, and with a time exposure, at will, either before or after the main portion of the film or sensitized element is exposed through the photographic lens for the picture, to positively fix such designation or mortise upon a desired portion of the film or element, which may be adjacent to the picture taken or to be taken thereon, and not necessarily involved in the picture, thereby leaving the latter independent of the designation or mortise produced upon the film or element, and also leaving the latter free for snapshots or desired time exposure.

My improvements are also applicable to permitting exposure of the portion of the film on which the designation or mortise is produced for more or less time exposure, and for more or less direct access of light thereto according to the state of the weather.

My invention comprises novel details of improvement and combinations of parts that will be more fully hereinafter set forth and then pointed out in the claims.

Reference is to be had to the accompanying drawings forming part hereof, wherein, Figure 1 is a face view of a camera embodying my improvements;

Fig. 2 is an edge view of a portion thereof;

Fig. 3 is a section on the line 3, 3, in Fig. 1;

Fig. 4 is an enlarged section on the line 4, 4, in Fig. 1;

Fig. 5 is a section on the line 5, 5, in Fig. 1;

Fig. 6 is a plan view of part of the camera showing the lid or cover 6 raised;

Fig. 7 is a plan view, the cover 6 and shutters 19 being removed;

Fig. 8 is an enlarged detail section, substantially on the line 5, 5, in Fig. 1;

Fig. 9 is an enlarged detail plan view of cover 6 and its hinge;

Fig. 10 is a section on the line 10, 10, in Fig. 9, and

Fig. 11 is a detail perspective view of holder 14.

Similar numerals of reference indicate corresponding parts in the several views.

The camera 1 may be of any desired or wellknown construction, the same being illustrated as of the type camera adapted for the use of cartridge film and having the removable cover 2 held upon the camera by the usual fastenings 2$^b$, the flexible film 3 being shown supported upon spool 4 in wellknown manner. The term "film" is used in the commonly accepted and non-technical sense, and is intended to identify the film structure as a whole, embracing not only the sensitized coating on the transparent base but also the opaque protecting paper at the rear, which bears the usual numbers for determining separate exposures visible through the ordinary inspection aperture indicated by 28 in the drawing. Within the camera and on the inner side of the film, in front of its sensitive surface, is located means to shut off a portion of the sensitive face of the film from the action of the light from exposure through the photographic lens $a$, and means are provided to control the admission of light, at will, to such shut off portion of the sensitive face of the film without regard to the use of lens $a$. To this end I provide a chamber within the camera adapted to contact with a portion of the sensitive face of the film, and means to admit light to such chamber at will when in contact with the film. In addition thereto I provide an opening in a side of the camera, such as opening 2$^a$ in cover 2, opposing said chamber to permit writing upon the opaque covering at the back of the film over said chamber. Said chamber is provided with a surface to bear against a portion of the sensitive face of the film when the latter is written upon to then support the film and to cause the writing to be fixed upon the sensitive face of the film. For this purpose I have shown a member 5 upon which the film may bear, said member being opposite opening 2$^a$. The member 5 may be a translucid plate or bar, by which I mean a member that is transparent, substantially transparent, or translucent. Such member may be of glass, celluloid or the like, so that its operating translucid face, or its face that permits the passage of light and which may be roughened is opposed to and in front of the face of the film, and the other faces or sides of member 5 may be opaque or rendered opaque in any suitable manner. To this end the last named faces or sides of member 5 may be silvered to render such faces opaque as well as reflective, or for such purpose member 5 may be placed in a trough 14 having its sides closed except on the side opposed to or in front of the sensitive face of the film, whereby the light will be precluded from striking through the lower sides of the trough into the translucid member 5. The chamber thus opaque on its sides, except on the side opposed to or in front of the sensitive face of the film, may be supported in any suitable manner as hereinafter explained, one or both end portions, however, of such chamber being open to admit light, provision being made to control the admission of light, as hereinafter set forth. From the foregoing it will be understood that the top portion of the chamber, or that portion in front of the sensitive face of the film, is not only translucid, but affords a base for the face of the film when the latter is to be written upon, and that when the chamber is in contact with the face of the film light will strike the inclosed or adjacent portion of the film only, when admitted to the chamber, and will not be transmitted to remote portions of the film because of the contact of the chamber with the film. Instead of the member 5 being translucid it may be opaque, and its surface in front of the film sufficiently below the upper edges of the trough 14 to provide a space 5$^a$ in front of the film to permit light, when admitted to such space, to affect the opposed sensitive face of the film with the same effect as when the light is permitted to strike such face of the film through the translucid member 5. A cover or lid 6 is shown hinged at 7 on cover 2 so as to close opening 2$^a$ when required. I have also shown cover 6 provided with a spring 9 adapted to be engaged at its ends by clips, hooks or the like 10 carried on opposite sides of the camera, spring means 11 (Fig. 4) being provided to cause the clips 10 to normally engage spring 9. I have shown clips 10 hinged upon the camera at 12.

To aid in preventing light striking through opening 2$^a$ when cover 6 is closed, I have shown said cover provided with ribs 6$^a$ on its inner face adapted to enter channels or recesses 6$^b$ in cover 2 (see Figs. 3 and 8). A locking device, such as a rotative stem 6$^c$, may be mounted on cover 2 and provided with a projection 6$^d$ to fit cover 9 to securely retain the latter closed. Cover 2 is shown provided with inwardly bent marginal flanges 2$^c$, entering frame 1, to exclude light at the joints. The arrangement is such that when cover 6 is raised to the desired extent, opening 2$^a$ will be free to permit writing upon the back of the film by a stylus or pencil, and by thus pressing the sensitive face of the film against member, bar or plate 5, on the lines of the characters formed, said characters will be caused to be fixed upon the sensitive face of the film, as by breaking or otherwise affecting the same where the writing has occurred, so that when such portion of the film is exposed to the light the writing will be fixed upon the film. Means are provided to permit the light to strike the film adjacent to the part written upon. For this purpose the light may strike through the translucid transfer medium or plate 5 after the writing has been produced thereon. The upper surface, or the surface in front of the film, of member or plate 5 as well as one or both ends or end portions thereof, are translucid, while the other sides of the member 5 are protected from the passage of light. To this end the bottom and adjacent sides of the member 5 may be protected from the light in any suitable manner, such as being silvered or coated with any suitable opaque material, or the member 5, either of plain or ground glass or the like, may be set in a holder, such as trough or channel piece 14 having its end or ends open for access of light thereto, the upper portion of trough or channel piece 14 being open to the opening $2^a$ (see Fig. 3), as before explained. I have shown trough or channel piece 14 carried by a support or spring 15 secured at 16 to camera 1, (Figs. 3 and 5), said spring having an upward tendency serving to press the member or plate 5 against film 3 when the cover 6 is raised, to thereby force the adjacent portion of the film against cover 2 to prevent the passage of light into the camera.

I may also provide means for regulating or controlling the pressure of the member 5 against film 3 additional to the support 15. To this end I have shown springs $15^a$ suitably guided in frame 1 and bearing against support 15 and resting upon heads on threaded rods or screws $15^b$ shown carried in nuts or the like $15^c$ sunk in frame 1 of the camera (see Figs. 4 and 5). By suitably rotating screws $15^b$ the springs $15^a$ may be placed under more or less tension to resiliently hold member or plate 5 against the film, and permit inward movement of the said member as hereinafter shown. The trough or channel piece 14 may be provided with one or more relatively sharp projections or pins $14^a$ (Figs. 5 and 11) adapted to pierce or engage the film, when the said member 5 is pressed against the film, to prevent the film from being moved at such time, which pins or projections release the film when the member 5 is depressed. Upon support or spring 15 adjacent the ends of member or plate 5 are boxes or frames 17, having their inner ends open at $17^a$ through which light may strike to the ends of member 5. At 18 are tubes carried by the sides of the camera, having their open lower ends communicating with and projecting slidably into boxes 17 and their upper ends opening through the camera (see Figs. 5, 7 and 8), whereby light may enter through tubes 18 and boxes 17 to the ends of the member 5. Tubes 18 may have a lens $b$ to intensify the light passing through the tubes. The upper ends of tubes 18 are in position to be closed by cover 6 when the latter is closed upon cover 2 to prevent light striking through said tubes. To aid in excluding light from passing into the camera at the joints between boxes 17 and the ends of trough 14, the inner vertical edges of boxes 17 are shown bent or turned inwardly at $17^c$ (Fig. 7) to coact with the outwardly turned ends $14^b$ of trough 14, the parts $14^b$ being fitted to slide freely in the grooves formed by the bent edges $17^c$ at the inner ends of boxes 17. Since it is intended that cover 6 is to be raised to permit writing upon the back of the film, and the light is not intended to strike through tubes 18 and boxes 17 until after the writing has been effected upon the film, I provide means to keep the tubes 18 closed until after the writing has been effected. To this end I provide shutters or closures 19 to close over the upper ends of tubes 18 (see Figs. 6, 7 and 8), and I provide means to retain said shutters closed when cover 6 is partly raised or, say, raised to a substantially vertical position, and to cause said shutters to be raised from over tubes 18 when cover 6 is swung back upon cover 2. Cover 2 is shown provided with openings or ferrules $18^a$ to receive tubes 18 and upon which ferrules shutters 19 fit (Fig. 8). The shutters 19 are shown hinged upon the pin 8 of hinge 7, and springs 20 upon said pins acting at one end against the shutters 19 and at the other end against cover 2, are arranged to press the shutters over tubes 18 until such time as cover 6 has been laid back the desired distance, whereupon said shutters are raised from openings $18^a$ and such shutters will be closed upon said openings when cover 6 is closed over opening $2^a$ and over the openings $18^a$. To cause cover 6, when drawn back from opening $2^a$, to raise or swing shutters 19 away from openings $18^a$ I have shown hinge 7 cut away near its ends to provide shoulders $7^a$ (Figs. 1, 9 and 10) adapted to engage shoulders or projections $19^a$ of shutters 19. The corresponding shoulders $7^a$, $19^a$ are spaced, when cover 6 and shutters 19 are closed upon cover 2, at such distances apart as to enable cover 6 to be raised a desired distance without causing shoulders $7^a$ to engage shoulders $19^a$, and yet when cover 6 is swung back a farther distance, shoulders $7^a$ by engaging shoulders $19^a$ will cause the shutters 19 to be raised from openings 18. Shutters 19 may be provided with projections $19^b$ adapted to fit in or on the ferrules $19^a$ (Figs. 5 and 8) to aid in excluding the passage of light when the shutters are closed. The trough 14, open on its side in front of the film, or the member, plate or bar 5 having silvered or opaque sides and its transparent or translucent side in front of the film, constitutes a chamber for light, and when against the sensitive face of the film permits the light, when admitted to the chamber, to strike the film adjacent to or over such chamber, and prevents such light from striking other portions of the film. The devices described will permit sufficient light to strike through tubes 18 and boxes 17, to the ends of member or plate 5 and thence through the latter to the surface of the film exposed to the transfer medium, under ordinary conditions of light, but where extra light is desired to affect the film upon member 5, such as during a dull day, I provide additional means to permit access of light to boxes 17. For this purpose I have shown tubes 21 (Figs. 5 and 8) extending from the openings 17$^b$ of the outer walls of boxes 17 through suitable openings 1$^a$ in frame 1, permitting said tubes to move up and down with said boxes, the openings 1$^a$ leading through the side walls of the camera frame. Means are provided to prevent light striking through openings 1$^a$ around tubes 21 into the camera. To this end I have shown washers or suitable extensions 21$^a$ secured on tubes 21 and fitted to slide in slots 1$^c$ in frame 1 (Figs. 5 and 8), plugs 1$^d$ fitted in slots 1$^c$ over washers 21$^a$ closing such slots. The tubes 21 may be screw threaded to work in the corresponding openings in washers 21$^a$ and the outer walls of boxes 17 to fit the tubes to such parts through the openings 1$^a$. Each tube 21 may be provided with a lens $c$ to intensify light entering tubes 21 as desired. The arrangement is such that as boxes 17 move, tubes 21 may likewise move in the openings 1$^a$, and the washers 21$^d$ by moving in the slots 1$^c$ permit such movement of boxes 17 and tubes 21 and prevent light from striking through the camera. The outer ends of tubes 21 are normally closed by suitable means and opened as required. To this end I have shown shutters 22 carried by the camera frame (Figs. 5 and 8) and normally spring pressed to the closed position. Shutters 22 are shown as pivotally supported upon the camera frame at 23 and pressed by springs 24 to closed position (Fig. 5). The arrangement of said springs is such that shutters 22 may be held open by such springs or be held closed according to the position of the shutters.

As it has been stated that when the writing is to be produced upon the back of the film, the member or plate 5 is preferably pressed against the film to raise the latter against cover 2 to prevent the passage of light at spaces or seams between such parts, it is also desirable to move the member 5 and the film away from cover 2 to permit the film to be propelled without pressing against the member 5. To this end I provide means for moving the member 5 inwardly of the camera when cover 6 is closed, and whereby when said cover is raised the springs 15 or 15$^a$ will be free to push the member 5 against the film and the latter against the edges of the opening 2$^a$ to prevent the passage of light. To this end studs or pins 25 (Figs. 4 and 7) are secured to the ends of support or spring 15 and are suitably guided, their upper ends being opposed to loose pins 26 carried by cover 2 and pressed by spring 9. (Figs. 4 and 6). The pins 26 are shown guided by ferrules 27 carried by cover 2 (Fig. 4), and the shutters 19 are provided with openings 19$^b$ to pass freely over the pins 26 (Fig. 6) while spring 9 is adapted to engage and push down the pins 26. The relative arrangement of these parts is such that when spring 9 is released the spring 15 or 15$^a$ will push pins 25 and 26 upwardly, at the same time pushing member or plate 5 against film 3, and pushing the latter against cover 2, but when cover 6 is closed spring 9 will bear upon pins 26 and push the latter against pins 25 thereby depressing spring 15 and member 5 and relieving the pressure of the latter upon the film, and disengaging pins 14$^a$ from the film.

The cover may have the usual ruby window 28 from which to observe the number on the film, and there may also be a ruby light 29, preferably diagonally opposite window 28, for the purpose of additional observation of movement of the film.

When all the parts are in their normal closed positions, the member or plate 5 will be held down, and the film will be free to be wound as usual. When it is desired to produce writing upon the film, cover 6 is partially raised, but not so high as to raise shutters 19 from tubes 18, whereupon member or plate 5 will be pushed outwardly against the film by springs 15 or 15$^a$. The operator then writes with a pencil or stylus upon the back of the outer cover of the film such designations as he may desire, the point of the stylus or pencil locally deforming the backing and film and bringing the portions of the sensitive face of the film which are directly beneath the stylus, into such contact with the member 5 as to compress, mar or otherwise affect it to such an extent that the writings or markings will appear in the developed negative. After the writing has been accomplished cover 6 is moved back to raise shutters 19 from over tubes 18 and thereupon light will strike through tubes 18 and boxes 17, and into the unobstructed ends of member or plate 5, and will thereby affect the sensitive surface of the film exposed to the member or plate 5 as to produce on the film, when developed, a relatively white or blank space within which the writing will appear in dark lines. If the light is not strong enough the shutters 22 may be opened to permit more light to pass through the tubes 21, or, shutters 22 may be opened without raising shutters 19 to admit the light directly to the ends of member 5. When the shutters and cover 6 are all closed the member or plate 5 will be moved inwardly to free the film to permit the same to be rolled as usual. The position of the member or plate 5 with respect to the position of the portion of the film exposed to lens $a$ may be such that the designation produced upon the film in the manner stated will be adjacent to one margin of the photograph, and the designation will be produced on the film irrespective of any exposure of the film to the light through the lens $a$. It will also be understood that the film may be used in the ordinary manner by not opening cover 6 or shutters 22 when desired, and at such time member 5 and trough 14 may be removed, if desired.

By means of my invention a photographer is enabled to write in arbitrary autographic characters directly upon the back of the film any desired designation, such as the name, date, initial, object photographed, and the like, and to cause the same to be affixed upon the film in such manner that photographs printed from the film may always bear such designation on their face. Of course, a blank space or mortise may be produced upon the film, by permitting light to strike the film in the manner stated, without having first written upon the film.

While I have shown shutter devices at both ends of the member, or transparent or translucent plate 5, it will be understood that such devices may be located at but one end thereof if preferred.

Where writing is to be produced upon the picture a flexible film is used, but where a blank space or mortise is to be produced upon the picture a film or sensitized plate may be used, hence by the term sensitized element I refer to either the film or the sensitized plate.

Changes may be made in the details of construction and arrangements set forth, within the scope of the appended claims, without departing from the spirit of my invention.

Having now described my invention what I claim is:—

1. A casing for holding sensitized material for photographic exposure, provided with means adapted to coöperate with a stylus to cause markings on a portion of the sensitized material in autographic characters while said material is protected from the action of actinic light and also provided with means for exposing the marked portion of the sensitized material to the action of actinic light, admitted otherwise than through the aperture by which the photographic exposure is made.

2. A holder for sensitized film provided with means for permitting access to the back of the contained film, a member for causing the reproduction upon the face of the film of markings applied against the back of the film, and means for admitting light through said member to the adjacent face of the film.

3. A film holder provided with means for permitting access to the back of the contained film, a member for causing the reproduction upon the face of the film of markings applied against the back of the film, and means for admitting light through said member to the adjacent face of the film and means to prevent light so admitted from striking the film elsewhere.

4. A film holder provided with means for permitting access to the back of the contained film, a member for causing the reproduction upon the face of the film of markings applied against the back of the film, means for admitting light through said member to the adjacent face of the film and means movable relatively to the film to prevent light entering the member from striking adjoining portions of the film.

5. A film holding camera provided with a lens through which photographic exposures are made, means within the holder for enabling the production of written characters at will upon the portion of the film adjacent the portion exposed through the lens and while protected from light, and additional means for admitting light when desired to the portion of the film upon which the characters may have been produced.

6. A camera provided with a lens and having a translucid member opposed to a portion of the sensitive face of the contained sensitized element, means to admit light through said member separate from said lens, and means to permit writing against said sensitized element opposed to said member.

7. A camera provided with a lens and having a translucid member opposed to the sensitive face of the contained sensitized element at one side of the axis of the lens, and means to prevent light that passes through said member from striking the sensitized element except in front of said member.

8. A camera provided with a translucid member in front of a portion of the sensitized face of a contained sensitized element, and means to prevent light that passes through said member from striking through said member to the sensitized element beyond said member.

9. A camera provided with a lens and having a chamber to admit light to a portion of the sensitive face of the contained sensitized element without passing through the lens, and a member in said chamber for contacting with the face of the element.

10. A camera provided with a translucid member in front of a portion of a contained sensitized element, and means to move said member and element in and out of contact with one another, and means to permit light to strike the portions of said element adjacent to said member.

11. A camera provided with a translucid member in front of a portion of the sensitive face of a contained sensitized element, and means to admit light at will through an end portion of said member to strike the portion of said element adjacent said member.

12. A camera provided with a member having a translucid face in front of a portion of the sensitive face of a contained sensitized element, means to prevent light striking through side portions of said member, and means to permit light to strike through an end portion of said member to the portion of the element adjacent to said member.

13. A camera provided with a trough open only on one side and open at an end, and a member within said trough having a translucid face in front of a portion of the sensitive face of a contained sensitized element, and means to admit light through a portion of said member to the portion of the element adjacent to said member.

14. A camera provided with a trough open only on one side and open at an end, and a member within said trough having a translucid face in front of a portion of the sensitive face of a contained sensitized element, and means to admit light through an end portion of said member to the portion of the element adjacent to said member.

15. A camera provided with a trough open only on one side and open at an end, and a member within said trough having a translucid face in front of a portion of the sensitive face of a contained sensitized element, means to admit light through an end portion of said member to the portion of the element adjacent to said member, and means to movably support said trough and member for movement toward and from the sensitized element.

16. A camera provided with a member having a translucid face in front of a portion of the sensitive face of a contained sensitized element, means to movably support said member, and means to move said member toward and from the sensitized element and means to permit light to strike said element adjacent to said member.

17. A camera provided with a member having a translucid face in front of a portion of the sensitive face of a contained sensitized element, means to support said member, means to permit light to strike said element adjacent to said member, said camera having a cover, and means to move said member and sensitized element relatively to one another.

18. A camera provided with a member having a translucid face in front of a portion of the sensitive face of a contained film, means to movably support said member, means to permit light to strike said element adjacent to said member, said camera having a cover, pins connected with said member, and means upon the cover to push said pins to move said member away from the film.

19. A camera having an opening adjacent a portion of its contained film, a member within the camera and provided with a translucid face in front of a portion of said film, and means to admit light at will through said member to the element opposite to said member.

20. A camera having an opening adjacent a portion of its contained film, a member within the camera and provided with a translucid face in front of a portion of said film, a cover for said opening, and means to admit light at will through said member to the element opposite to said member.

21. A camera having an opening adjacent a portion of its contained film, a member within the camera and provided with a translucid face in front of a portion of said film, a cover for said opening, and means operative with said cover to admit light through said member to the element opposite to said member.

22. A camera having an opening adjacent a portion of its contained film, a member within the camera and provided with a translucid face in front of a portion of said film, a cover for said opening, and a shutter operative with the cover to admit light to said member to the element opposite to said member.

23. A camera having an opening adjacent a portion of its contained film, a member within the camera opposite said opening and provided with a translucid face in front of a portion of said film, a cover for said opening, and a shutter operative with the cover to exclude light from said member when said cover is closed or partially closed and to admit light to said member when said cover is further opened.

24. A camera having an opening adjacent a portion of its contained film, a member within the camera opposite said opening and provided with a translucid face in front of a portion of said film, said camera having an opening to admit light to said member, a cover for the first named opening, and means to admit light at will through the second named opening.

25. A camera having an opening adjacent a portion of its contained film, a member within the camera opposite said opening and provided with a translucid face in front of a portion of said film, said camera having an opening to admit light to said member, a cover for the first named opening, and means operative with said cover to admit light through said second named opening.

26. A camera having an opening adjacent a portion of its contained film, a member within the camera opposite said opening and provided with a translucid face in front of a portion of said film, said camera having an opening to admit light to said member, a cover for the first named opening, and a shutter operative with the cover to admit light through the said second named opening.

27. A camera having an opening adjacent a portion of its contained film, a member within the camera opposite said opening and provided with a translucid face in front of a portion of said film, said camera having an opening to admit light to said member, a cover for the first named opening, a shutter to close the second named opening, and co-acting members between the cover and shutter to have movement independent of the shutter for a suitable distance and to coact with the shutter to move the latter from the second named opening upon further movement of said cover.

28. A camera having an opening adjacent a portion of its contained film, a member within the camera opposite said opening and provided with a translucid face in front of a portion of said film, said camera having an opening to admit light to said member, a cover for the first named opening, a shutter to close the second named opening, said cover and shutter having spaced shoulders to engage one another after the cover is moved a suitable distance, and a spring normally closing said shutter.

29. A camera having an opening adjacent a portion of its contained film, a member within the camera provided with a translucid face in front of a portion of the contained film, said camera having an opening in front of the end of said member to admit light thereto, and a shutter to control said opening.

30. A camera having an opening adjacent a portion of its contained film, a member within the camera provided with a translucid face in front of a portion of said film, a support for said member, a box carried by said support adjacent the end of said member and provided with an opening communicating with said end of said member, said box having a second opening communicating with an opening in the camera, and means to control the last named opening at will.

31. A camera having an opening adjacent a portion of its contained film, a member within the camera provided with a translucid face in front of a portion of the contained film, a support for said member, a box carried by said support adjacent the end of said member and provided with an opening communicating with said end of said member, said box having a second opening, a tube fitted to said opening, the camera having an opening receiving said tube, and means to control the last named opening at will.

32. A camera having an opening adjacent a portion of its contained film, a member within the camera provided with a translucid face in front of a portion of said film, a support for said member, a box carried by said support adjacent the end of said member and provided with an opening communicating with said end of said member, said box having a second opening, a tube fitted to said opening, the camera having an opening receiving said tube, and means to control the last named opening at will, said tube having means to prevent the passage of light into the camera around the tube.

33. A camera having an opening adjacent a portion of its contained film, a member within the camera provided with a translucid face in front of a portion of said film, a support for said member, a box carried by said support adjacent the end of said member and provided with an opening communicating with said end of said member, said box having a second opening, a tube fitted to said opening, the camera having an opening receiving said tube, and means to control the last named opening at will, said tube being provided with a washer to close said opening in the camera.

34. A camera having an opening adjacent a portion of its contained film, a member within the camera provided with a translucid face in front of a portion of said film, a support for said member, a box carried by said support adjacent the end of said member and provided with an opening communicating with said end of said member, said box having a second opening communicating with an opening in the camera, and means to control the last named opening at will, said box having another opening, a tube communicating with said opening, and means to control the passage of light through said tube at will.

35. A camera having an opening adjacent a portion of its contained film, a member within the camera and provided with a translucid face in front of a portion of said film, a support for said member, a box carried by said support adjacent the end of said member and provided with an opening communicating with said end of said member, said box having a second opening communicating with an opening in the camera, and means to control the last named opening at will, and a shutter to control the passage of light through said tube at will.

36. A camera having an opening adjacent a portion of its contained film, a member within the camera and provided with a translucid face in front of a portion of said film, a support for said member, a box carried by said support adjacent the end of said member and provided with an opening communicating with said end of said member, said box having a second opening communicating with an opening in the camera, a tube communicating with said openings, and means to control the passage of light through said tube at will, and a cover for the first named opening.

37. A camera having an opening adjacent a portion of its contained film, a member within the camera provided with a translucid face in front of a portion of said film, a support for said member, a box carried by said support adjacent the end of said member and provided with an opening communicating with said end of said member, said box having a second opening communicating with an opening in the camera, a tube communicating with said openings, a shutter to control the passage of light through said tube at will, a cover for the first named opening, and means for causing said cover and shutter to be operated together to uncover their corresponding openings conjointly.

38. A camera provided with an opening adjacent a portion of its contained film, a member within the camera having a translucid face opposed to a portion of said film, a trough receiving said member, a support for said trough, said trough having bent ends, a box carried by said support having grooves receiving the bent ends of said trough, said box having an inner opening adjacent the end of said member to admit light thereto, said box having openings spaced from the first named openings, the camera frame having openings to admit light to said second named openings of the box, and means to control the second named openings of the camera frame.

39. A camera provided with an opening adjacent a portion of its contained film and having grooves around said opening, a cover to close said opening and provided with ribs to enter said grooves, a member within the camera opposite said opening in front of a portion of the sensitive face of its film, and means to admit light at will through said member.

40. A camera provided with an opening opposed to a portion of its contained film, a cover to control said opening, a spring on said cover, clips on the camera to engage said spring, a member within the camera opposite said opening in front of a portion of the sensitive face of its film, and means to admit light at will to said member.

41. A camera provided with an opening opposed to a portion of its contained film, a member within the camera opposite said opening in front of a portion of said film, a support for said member, means to move said member and film with relation to one another, and means to engage the film to prevent its movement when said member engages the film.

42. A camera provided with an opening opposed to a portion of its contained film, a member within the camera opposite said opening in front of a portion of its contained film, a support for said member, means to move said member and film with relation to one another, and a pin connected with said support to engage the film to prevent its movement when the member engages the film.

43. A camera provided with an opening adjacent a portion of its contained film, a member within the camera opposed to a portion of the sensitive face of its film, a support for said member, a spring coacting with said support, and means to vary the tension of said spring.

44. A camera provided with an opening adjacent a portion of its contained film, a member within the camera opposed to a portion of the sensitive face of its film, a support for said member, a spring coacting with said support, and a screw coacting with said spring to vary its tension with respect to said support.

45. A camera provided with an opening adjacent a portion of its contained film, a translucid member having a roughened surface opposite said opening in front of said portion of the sensitive face of the film, and means to permit light to strike through said member at will only against the sensitive face of the film.

46. A camera provided with an opening adjacent a portion of its contained film, a translucid member having a roughened surface opposite said opening in front of said portion of the sensitive face of the film, means to permit light to strike through said member at will against the sensitive face of the film, and means to prevent light from striking through said member except through its surface in front of the film.

47. A camera provided with a photographic lens and having means to shut off a portion of its contained sensitized element from said lens, and means to admit light to said shut off portion of the sensitized element without using said lens, said camera having means to permit manual production of designations upon the sensitive surface of said element at such shut off portion.

48. A camera provided with a photographic lens and having means to shut off a portion of its contained sensitized element from said lens, and means to admit light to said shut off portion of the sensitized element, said camera having means to permit manual production of designations upon the sensitive surface of said element at such shut off portion.

49. A camera provided with a chamber for light located in front of a portion of a contained sensitized element, means to prevent light within said chamber from striking the sensitized element except opposite said chamber and means at will to admit light to said chamber, said camera having means to permit manual production of designations upon the sensitive surface of said element, within said chamber.

50. A camera provided with a chamber for light located in front of a portion of a contained sensitized element, means to cause the chamber walls and element to be moved relatively one to another to contact with each other to prevent light from the chamber striking the element except adjacent the chamber, and means to admit light to said chamber at will, said camera having an opening opposed to said chamber to permit writing against such portion of said element.

51. A camera provided with a chamber for light located in front of a portion of a contained sensitized element, means to retain the chamber walls and the sensitive face of the element in contact, means to admit light to said chamber, and means to disengage the chamber and element from each other, said camera having an opening opposed to said chamber to permit writing against such portion of said element.

52. A camera provided with a chamber for light located in front of a portion of a contained sensitized element, means to retain the chamber walls and the sensitive face of the element in contact, means to admit light to said chamber, a cover on the camera over the element, and means coacting with the cover and the chamber to disengage the chamber and the element when the cover is closed.

53. A camera provided with a chamber for light located in front of a portion of a contained sensitized element, means to retain the chamber walls and the sensitive face of the element in contact, means to admit light to said chamber, a cover on the camera over the element, and means coacting with the cover and the chamber to disengage the chamber and the element when the cover is closed, said means permitting engagement of the chamber and element when the cover is opened.

54. A camera provided with a trough having one side open and having a bearing surface below its edges at said opening of the trough opposed to the sensitive face of the contained sensitized element providing a space therebetween, and means to admit light to said space at will.

55. A camera provided with a trough having one side open and having a bearing surface below its edges at said opening of the trough opposed to the sensitive face of the contained sensitized element to provide a space therebetween, means to admit light to said space at will, and a shutter adjacent to an end of said space to control the admission of light thereto.

56. A camera provided with a photographic lens and having an opening for the admission of light separate from said lens, and means for holding a translucid member in the line of exposure through said opening to admit light through said member to a portion of a contained sensitized element separate from the admission of light to said element through said lens.

57. A camera provided with a photographic lens and having an opening for the admission of light separate from said lens, and means for holding a translucid member in the line of exposure through said opening to admit light through said member to a portion of a contained sensitized element separate from the admission of light to said element through said lens, and means to control the admission of light from said opening to said member at will.

58. A camera provided with a photographic lens and having an opening for the admission of light separate from said lens, and means for holding a translucent member in the line of exposure through said opening to admit light through said member to a portion of a contained sensitized element separate from the admission of light to said element through said lens, and means to control the admission of light from said opening to said member at will, and separate from the admission of light through said lens.

59. In a holder for photographic film the combination with a casing having an opening through which a limited area of the film is made accessible from the exterior for the application of indicia, and a closure for said opening, of a clamping device for engaging the film and holding it stationary when the closure is open.

60. In a holder for photographic film the combination with a casing having an opening through which a limited area of the film is made accessible from the exterior of the holder for the application of indicia and a closure for said opening, of an automatic clamping device for engaging and holding the film at the margin of the opening and controlled by the movement of the closure.

61. In a holder for photographic film, the combination with a casing and means for holding and feeding the film therein, of a light conduit within the holder having an open side toward the film, the edges thereof being adapted to contact with the face of the film, means for causing the relative movement of the film and conduit toward and from each other and means for admitting light to said chamber.

62. In a holder for photographic film, the combination with a casing and means for holding and feeding the film therein, of a chamber open on one side only, the walls bounding the open side being adapted to engage the face of the film, said chamber and film being relatively movable toward and from each other and means for admitting light to the chamber when the edges thereof are in contact with the film.

63. In combination a holder for sensitized material, said holder having an opening therein and a flexible light excluding covering therefor for preventing actinic light from striking the sensitized material, a translucid support holding said material adjacent the opening so that the material may be written against through the opening, and means for admitting light to the sensitized material through the support.

64. In combination a holder for a sensitized element, said holder having an opening therein and a support holding the sensitized material adjacent the opening, a locally deformable light excluding cover extending over the sensitized material, a translucid member on the opposite side of the sensitized material from the opening to support a portion of the sensitized material for writing thereagainst through the opening and means for controlling the passage of light through the translucid member to the sensitized element.

65. The combination of a camera with a translucid support for a sensitized element, a locally deformable light excluding medium on that side of the sensitized element which is opposite from the support and accessible from the exterior of the camera whereby writing may be applied through said medium against the sensitized element, and means for admitting light through the translucid support to the element.

66. The combination of a camera having a lens with a translucid support for a sensitized element, a locally deformable light excluding medium on the opposite side of the element from the support and accessible from the exterior of the camera allowing designations to be manually made against the sensitized element and means apart from the lens for admitting light through the support to the element.

Signed at New York city, in the county of New York, and State of New York, this 28th day of March, A. D. 1912.

HENRY J. GAISMAN.

Witnesses:
T. F. BOURNE,
MARIE F. WAINRIGHT.